Figure 1A:
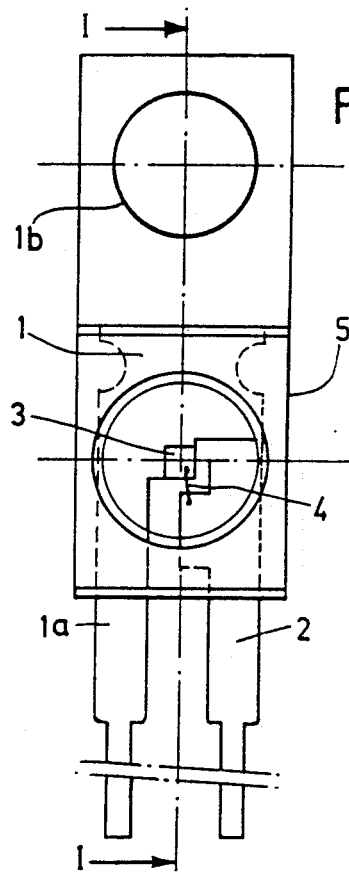

United States Patent [19]

Thillays

[11] Patent Number: 4,968,114
[45] Date of Patent: Nov. 6, 1990

[54] METHOD OF MANUFACTURING AN OPTICAL TRANSMITTER OR RECEIVER DEVICE

[75] Inventor: Jacques C. Thillays, Herouville St Clair, France

[73] Assignee: U.S. Philips Corp., New York, N.Y.

[21] Appl. No.: 792,622

[22] Filed: Oct. 24, 1985

Related U.S. Application Data

[63] Continuation of Ser. No. 533,707, Sep. 19, 1983, abandoned.

[30] Foreign Application Priority Data

Sep. 24, 1982 [FR] France ............................ 82 16092

[51] Int. Cl.[5] .............................................. G02B 6/42
[52] U.S. Cl. ................................. 350/96.20; 350/320
[58] Field of Search ............... 350/96.15, 96.17, 96.18, 350/96.20, 96.21, 320; 250/227; 357/17, 19, 74

[56] References Cited

U.S. PATENT DOCUMENTS

| | | | |
|---|---|---|---|
| 4,189,206 | 2/1980 | Terai et al. | 350/96.2 |
| 4,385,800 | 5/1983 | Basola et al. | 350/96.20 |
| 4,465,905 | 8/1984 | Nation | 381/194 |

FOREIGN PATENT DOCUMENTS

| | | | |
|---|---|---|---|
| 2654653 | 8/1978 | Fed. Rep. of Germany | 350/96.20 |
| 0037443 | 3/1977 | Japan | 350/96.21 |
| 53-147547 | 12/1978 | Japan | 350/96.21 |
| 0037511 | 3/1984 | Japan | 350/96.2 |
| 1461693 | 1/1977 | United Kingdom . | |
| 2046472 | 11/1980 | United Kingdom . | |

OTHER PUBLICATIONS

Ando et al., "Self-Aligning Optical-Fibre Connector with Magnetic-Alloy-Clad Fibers," *Electronics Letters*, vol. 17, No. 21 (10/1981), pp. 793-795.

*Primary Examiner*—John D. Lee
*Attorney, Agent, or Firm*—William L. Botjer

[57] ABSTRACT

The method comprises an operation for the centering of the end of an optical fibre (8) with respect to an optical element which comprises an opto-electronic component (3). To this end, a magnetizable ring (7) is secured on the surface of a bottom plate (1) which is connected to the optical element, said ring being attracted, under the influence of a magnetic field, against a ferromagnetic bush (9) which is secured to the end of the fibre (8), said ring thus being positioned so that the light transmission efficiency is optimum and being retained in this position, after which the assembly is provided with an opaque plastics envelope.

9 Claims, 2 Drawing Sheets

METHOD OF MANUFACTURING AN OPTICAL TRANSMITTER OR RECEIVER DEVICE

This is a continuation, of application Ser. No. 533,707, filed Sept. 19, 1983 (abandoned).

The invention relates to a method of manufacturing a transmitter or receiver device for optical signals, including an operation for the centring of a first optical element with respect to a second optical element, said first element comprising an optical fibre, an end of said optical fibre which is to be arranged opposite the second element being secured in a bush, the second element comprising an opto-electronic component, the active side of said end of the fibre being positioned in accordance with said method so that the light transmission efficiency of the assembly is optimum, after which the assembly is secured in said position and provided with a plastics envelope which is impenetrable to external light rays.

The invention also relates to a device manufactured by means of this method.

In the telecommunication technique it is known to replace coaxial electrical connections between electronic apparatus by optical connections which are formed by means of optical fibres which are arranged in a suitable envelope and which interconnect a light source and a light receiver. These optical fibres, being usable in high frequency ranges, offer the advantage that they are insensitive to external interference and they also have a smaller attenuation factor than the conventional coaxial cables. Moreover, these optical fibres enable connections to be established between points of different electrical potential and optical fibres are also lighter than coaxial cables.

In order to ensure that optimum data transmission is achieved in a fibre, it is desirable to create optimum coupling between the fibre and the light source or the light receiver; therefore, high-precision centring and adjustment of the distance between the radiation source or receiver and the active side of the fibre is necessary.

The most recent types of optical transmission devices are provided at each end of the fibre with an opto-electronic component which is arranged on a support and which comprises an opaque plastics envelope. Opposite the opto-electronic component inside this envelope there is formed a duct in which one end of a "pigtail" fibre is secured, the other end thereof being connected to the transmission fibre. In order to facilitate its anchoring in the opaque plastics envelope, the pigtail fibre is provided at its end with a cylindrical, usually metal adapter which is secured on the plastics envelope which protects the active part of the fibre.

Obviously, it is comparatively difficult to centre the opto-electronic component, being mounted on a flat side of a comparatively wide support which also acts as a cooling plate, with respect to the optical fibre passed through the duct and to maintain the correct distance between said opto-electronic component and the active side of the end of the fibre. This is because the tolerances of the diameter of the optical fibre, the cylinder and the duct which are necessary for easy insertion of the fibre often cause a substantial clearance between these parts.

Between the instant at which the fibre is positioned with respect to the opto-electronic component and the instant at which the fibre is secured in the duct, generally a comparatively long period of time expires (notably due to the various operations and the setting of the adhesive) during which the components should be maintained in their initial position; this is more difficult as the clearance between said parts is larger.

It is the object of the invention to mitigate these drawbacks; the invention utilizes the magnetic properties of given materials, for this purpose.

To this end, the invention is characterized in that on the surface of a bottom plate which forms part of the second optical element and on which the opto-electronic component is mounted there is secured a ring which is substantially concentric with said component and which is made of a magnetizable material, a magnetic field being generated in said ring whereby the bush which is secured to the end of the optical fibre of the first optical element and which is made of ferromagnetic material is attracted against and maintained in position on the flat outer side of the ring, the position of the fibre in which the transmission efficiency is optimum being determined by displacement of the bush across said surface, the bush being retained by the magnetic field in the position thus determined on the ring, after which the assembly is provided with the opaque plastics envelope.

The use of this method offers many advantages. For example, in the case of a radiation source which emits in space substantially in accordance with Lambert's law it has been found that, in spite of the small dimensions of the radiation source and the optical fibre, the latter can be readily positioned so that the transmission efficiency of the quantity of light emitted is optimum, taking into account the acceptance angle of the optical fibre. Moreover, no problems whatsoever are encountered as regards keeping the fibre in this position until and during the fixing operation.

In a first version of the method in accordance with the invention, the ring is made of a ferromagnetic material having a high remanance, said generated magnetic field being permanently present in said ring; however, in a preferred version of the method the magnetic field generated in the ring is only temporarily present, that is to say until the optical fibre has been permanently fixed in the chosen position.

In the latter case the magnetic field in the ring is preferably generated by means of a solenoid which is temporarily arranged underneath the bottom piece supporting the ring.

The ring is preferably made of magnetoceramic material, such as ferrite, which is of the hard ferrite type when the magnetization is to be permanent and of the soft ferrite type if the magnetization is only temporary.

This is because ferrite offers the advantage that it combines a high magnetic permeability with a high electrical resistance, so that this material is substantially electrically insulating; this notably facilitates the contacting on the opto-electronic component so that the risk of short-circuits with the end of the oppositely situated optical fibre is substantially reduced during assembly.

The invention also relates to a device manufactured by means of the described method, comprising two optical elements, the first of which comprises at least one optical fibre on an end of which a bush is secured opposite the second element, the second element comprising an opto-electronic component, both optical elements being provided with an opaque plastics envelope, said transmission device being characterized in that the second optical element also comprises a bottom plate on which there is secured a ring of a material which can at least temporarily have magnetic properties, said ring resting against the bush which is secured on the end of the fibre of the first optical element.

Figure 1B:
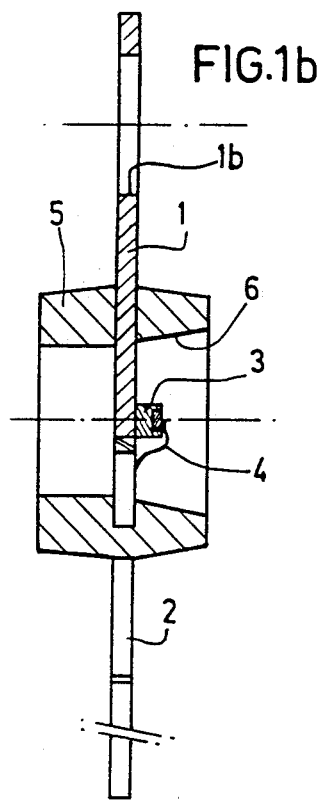
Figure 2:
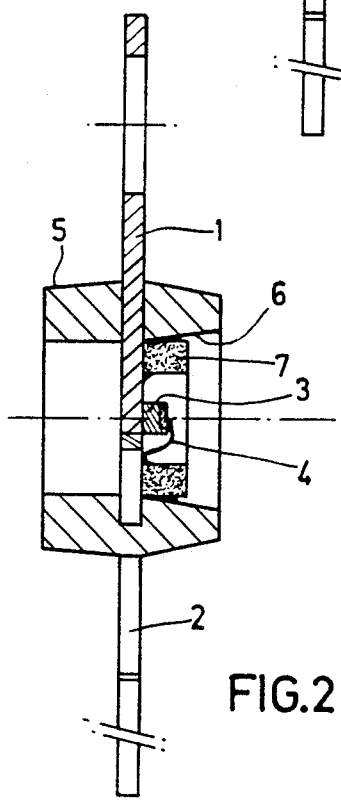
Figure 3:
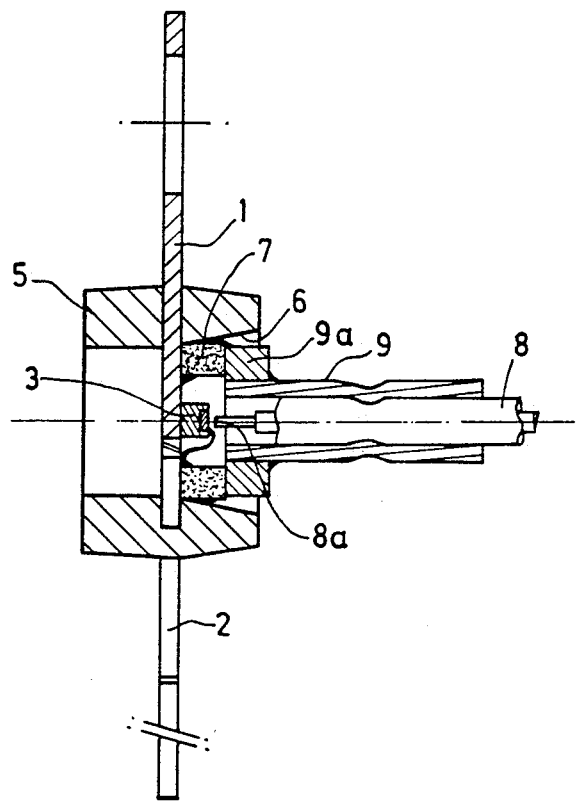

The invention will be described in detail hereinafter with reference to the drawing; wherein:

FIGS. 1 to 3 diagrammatically illustrate different stages of the method in accordance with the invention in a customary version which relates to an optical transmission device comprising a side exit for the pigtail fibre.

It is to be noted that the dimensions in the Figures are strongly exaggerated and are not shown in the correct proportions for the sake of clarity.

The FIGS. 1a and 1b are a front view and a sectional view taken along the line I—I, respectively, of a device in accordance with the invention in the first stage of manufacture. Use is made of an element from an assembly which is known as a "grid" by those skilled in the art and which comprises a metal bottom plate 1 which continues in a first connection strip 1a and a second connection strip 2. A semiconductor crystal with the opto-electronic component 3 is soldered on the metal bottom plate 1; said component consists of two regions, one of which is in direct contact with said bottom plate 1 whilst the other region is connected to the connection strip 2 by way of a metal wire 4. The opto-electronic component 3 and the bottom plate on which it is mounted form the second one of two optical elements of the device manufactured by means of the method in accordance with the invention. In order to facilitate the heat dissipation of the crystal, the bottom plate 1 preferably has large surface area and may be provided with a hole 1b via which it can be mounted on a further cooling plate.

During the subsequent operation, the assembly is arranged in an envelope which is formed by a cast resin block 5 in which a, for example, slightly tapered hole 6 is provided at the area of the opto-electronic component 3, the bottom thereof being formed by the visible surface of the bottom plate 1.

In accordance with FIG. 2, in the hole 6 there is arranged a ring 7 which is made of a magnetizable material and which has an external diameter which is substantially equal to the diameter of the lower side of said hole, the ring subsequently being soldered to the bottom of said hole. In order to prevent short-circuits between the connection wire 4 and the bottom plate 1 via the ring 7, the ring is preferably made of a magnetoceramic material of the ferrite type. In accordance with the invention, the ring 7 is provided in order to facilitate the centring and fixing of the end of an optical fibre 8 which is to be positioned opposite the opto-electronic component 3 and which is secured in advance in a bush 9, at least a part 9a of which is made of a material having a strong magnetic permeability. The fibre 8 constitutes the first optical element of the device.

Using a suitable means, for example, an electromagnet which is arranged underneath the ring 7, a magnetic field is generated in this ring; this field is sufficiently strong to attract the bush 9 and to ensure that the side 9 thereof comes to rest against the flat outer surface of said ring, be it so that the ring can laterally slide across this surface. After the temporary connection of the opto-electronic component 3 and the optical fibre 8 to measuring equipment, the bush 9 is displaced across the ring 7 (i.e. the active side 8a of the end of the fibre 8 is displaced with respect to the opto-electronic component 3) until an optimum transmission efficiency is obtained. After the best position has thus been determined, the bush is retained in this position by the magnetic field until the bush is ultimately secured by gluing or soldering.

During the last operation (not shown in FIG. 3) the assembly is provided with an opaque plastics envelope which is impenetratable to external light rays.

What is claimed is:

1. An optical transmitting or receiving device comprising:
   an optical fiber having an end;
   a soft magnetizable bushing on the end of the optical fiber;
   a bottom plate;
   an electrooptic component mounted on the bottom plate;
   a soft magnetizable ring mounted on the bottom plate substantially concentric to the electrooptic component, the ring bearing agaist the bushing so that the end of the optical fiber is arranged opposite an active side of the electrooptic component; and
   means for nondetachably fastening the bushing to the ring.

2. An optical transmitting or receiving device comprising:
   an optical fiber having an end;
   a magnetizable bushing on the end of the optical fiber;
   a bottom plate;
   an electrooptic component mounted on the bottom plate;
   a magnetizable ring mounted on the bottom plate substantially concentric to the electrooptic component, the ring bearing against the bushing so that the end of the optical fiber is arranged opposite an active side of the electrooptic component; and
   means for nondetachably fastening the bushing to the ring.

3. A device as claimed in claim 2 characterized in that the means for nondetachably fastening the bushing to the ring comprises an opaque plastic envelope surrounding the bushing and the ring.

4. A method of manufacturing an optical transmitting or receiving device, said method comprising the steps of:
   mounting an end of an optical fiber in a magnetizable bushing;
   mounting an electrooptic component on a bottom plate;
   mounting a magnetizable ring on the bottom plate substantially concentric with the electrooptic component;
   contacting the bushing to the ring so as to arrange the end of the optical fiber opposite an active side of the electrooptic component;
   displacing the bushing relative to the ring, while concurrently measuring the light transmission efficiency between the fiber and the electrooptic component, until the fiber and electrooptic component are positioned for maximum transmission efficiency;
   generating a magnetic field in the bushing and ring to cause the bushing and ring to be magnetically attracted to each other to hold the fiber and electrooptic component in their position for maximum transmission efficiency; and
   nondetachably securing the bushing to the ring.

5. The method as claimed in claim 4, characterized in that the bushing is secured to the ring by providing an opaque plastic envelope around the bushing and the ring.

6. The method as claimed in claim 5, characterized in that the ring is mounted to the bottom plate by soldering.

7. The method as claimed in claim 6, characterized in that the magnetic field is generated only until the bushing and ring are nondetachably secured to each other.

8. The method as claimed in claim 7, characterized in that the bushing and the ring are made of ferrites.

9. A method of manufacturing an optical transmitting or receiving device, said method comprising the steps of:

mounting an end of an optical fiber in a magnetizable bushing;

mounting an electrooptic component on a bottom plate;

mounting a magnetizable ring on the bottom plate substantially concentric with the electrooptic component;

contacting the bushing to the ring so as to arrange the end of the optical fiber opposite an active side of the electrooptic component;

displacing the bushing relative to the ring, while concurrently measuring the light transmission efficiency between the fiber and the electrooptic component, until the fiber and electrooptic component are positioned for maximum transmission efficiency;

generating a temporary magnetic field in the bushing and the ring to cause the bushing and the ring to be magnetically attracted to each other to hold the fiber and the electrooptic component in their positions for maximum transmission efficiency; and nondetachably securing the bushing to the ring.

* * * * *